United States Patent
Smedberg et al.

(10) Patent No.: US 11,078,312 B2
(45) Date of Patent: Aug. 3, 2021

(54) CROSSLINKABLE POLYMER COMPOSITION AND CABLE WITH ADVANTAGEOUS ELECTRICAL PROPERTIES

(75) Inventors: Annika Smedberg, Myggenas (SE); Birgitta Kallstrand, Vasteras (SE); Ulf Nilsson, Stenungsund (SE); Per-Ola Hagstrand, Stenungsund (SE); Villgot Englund, Gothenburg (SE); Gustavo Dominguez, Vasteras (SE); Carl-Olof Olsson, Vasteras (SE); Liu Rongsheng, Vasteras (SE); Marc Jeroense, Karlskrona (SE)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 13/509,268

(22) PCT Filed: Nov. 3, 2010

(86) PCT No.: PCT/EP2010/066712
§ 371 (c)(1),
(2), (4) Date: Aug. 3, 2012

(87) PCT Pub. No.: WO2011/057928
PCT Pub. Date: May 19, 2011

(65) Prior Publication Data
US 2013/0000947 A1    Jan. 3, 2013

(30) Foreign Application Priority Data

Nov. 11, 2009 (EP) .................................... 09175688

(51) Int. Cl.
| | | |
|---|---|---|
| H01B 3/44 | (2006.01) | |
| C08F 210/02 | (2006.01) | |
| C08K 5/14 | (2006.01) | |
| C08F 210/16 | (2006.01) | |
| C08F 110/02 | (2006.01) | |

(52) U.S. Cl.
CPC .............. C08F 210/02 (2013.01); C08K 5/14 (2013.01); H01B 3/441 (2013.01); C08F 110/02 (2013.01); C08F 210/16 (2013.01)

(58) Field of Classification Search
None
See application file for complete search history.

(56) References Cited

U.S. PATENT DOCUMENTS

| | | | |
|---|---|---|---|
| 3,098,893 A | 7/1963 | Pringle et al. | |
| 4,049,757 A | 9/1977 | Kammel et al. | |
| 4,721,761 A | 1/1988 | Omae et al. | |
| 5,246,783 A * | 9/1993 | Spenadel ............... | H01B 3/441 174/110 R |
| 5,539,075 A * | 7/1996 | Gustafsson et al. .......... | 526/339 |
| 5,852,135 A | 12/1998 | Kanai et al. | |
| 6,231,978 B1 * | 5/2001 | Keogh ........................... | 428/378 |
| 7,473,742 B2 * | 1/2009 | Easter ........................... | 525/383 |
| 2001/0030053 A1 | 10/2001 | Gadessaud et al. | |
| 2002/0022687 A1 | 2/2002 | Hikita et al. | |
| 2002/0034689 A1 | 3/2002 | Hoshida et al. | |
| 2002/0042451 A1 | 4/2002 | Sugaya | |
| 2002/0127401 A1 | 9/2002 | Perego et al. | |
| 2004/0138351 A1 | 7/2004 | Kaprinidis et al. | |
| 2004/0210002 A1 | 10/2004 | Haekoenen et al. | |
| 2006/0055075 A1 | 3/2006 | Hoshida et al. | |
| 2006/0116279 A1 | 6/2006 | Kogoi et al. | |
| 2006/0151758 A1 | 7/2006 | Reyes | |
| 2006/0249705 A1 | 11/2006 | Wang et al. | |
| 2007/0048472 A1 * | 3/2007 | Krishnaswamy et al. ... | 428/35.7 |
| 2007/0299173 A1 | 12/2007 | Wolfschwenger et al. | |
| 2008/0124521 A1 | 5/2008 | Niino | |
| 2008/0254289 A1 * | 10/2008 | Bostrom ................... | C08K 5/01 428/375 |
| 2008/0315159 A1 | 12/2008 | Minagoshi | |
| 2008/0319137 A1 * | 12/2008 | Rufner .................... | A61L 27/16 525/333.7 |
| 2009/0045908 A1 | 2/2009 | Tanaka et al. | |

(Continued)

FOREIGN PATENT DOCUMENTS

| | | |
|---|---|---|
| DE | 1769723 | 2/1972 |
| EP | 0150610 | 8/1985 |
| EP | 0517868 B1 | 11/1995 |
| EP | 0688794 B1 | 8/1998 |
| EP | 0887355 A1 | 12/1998 |
| EP | 1168469 A2 | 1/2002 |

(Continued)

OTHER PUBLICATIONS

International Search Report and Written Opinion dated Dec. 2, 2010 for International Application No. PCT/EP2010/066712.

(Continued)

Primary Examiner — Elizabeth A Robinson
Assistant Examiner — Daniel D Lowrey
(74) Attorney, Agent, or Firm — Knobbe, Martens, Olson & Bear LLP

(57) ABSTRACT

A cross-linked polymer composition includes a cross-linked polyolefin. Peroxide in an amount of less than 35 mmol —O—O—/kg polymer composition may be included in the polymer composition prior to crosslinking the polyolefin. Suitable polyolefins that can be cross-linked in the polymer composition include an unsaturated LDPE homopolymer and an unsaturated LDPE copolymer of ethylene with one or more comonomers. Such unsaturated LDPE polymer can contain vinyl groups, and the total amount of vinyl groups present in the unsaturated LDPE can be higher than 0.05/ 1000 carbon atoms. The cross-linked polymer composition can be used, for example, in producing a cross-linkable and cross-linked article such as a cross-linkable and cross-linked direct current (DC) or other type of power cable.

8 Claims, 1 Drawing Sheet

(56) References Cited

U.S. PATENT DOCUMENTS

| | | | |
|---|---|---|---|
| 2009/0227717 A1* | 9/2009 | Smedberg et al. | 524/317 |
| 2009/0238957 A1 | 9/2009 | Clancy | |
| 2009/0280282 A1 | 11/2009 | Doty et al. | |
| 2010/0086268 A1 | 4/2010 | Reyes | |
| 2011/0042624 A1 | 2/2011 | Minagoshi | |
| 2011/0196078 A1 | 8/2011 | Wolfschwenger et al. | |
| 2012/0285722 A1* | 11/2012 | Nilsson | C08F 10/00 174/110 SR |
| 2012/0305284 A1* | 12/2012 | Nilsson | C08F 10/02 174/110 SR |

FOREIGN PATENT DOCUMENTS

| | | | |
|---|---|---|---|
| EP | 11211289 A1 | 6/2002 | |
| EP | 0810235 B1 | 11/2004 | |
| EP | 1484345 A1 | 12/2004 | |
| EP | 1669403 A1 | 6/2006 | |
| EP | 1695996 A1 | 8/2006 | |
| EP | 1944326 A1 | 7/2008 | |
| EP | 1731564 B1 | 3/2010 | |
| EP | 0463402 | 5/2012 | |
| JP | 02018811 A | 7/1988 | |
| JP | H02-018811 | 1/1990 | |
| JP | 2 272031 A | 11/1990 | |
| JP | 05-062529 | 12/1993 | |
| JP | 05-298927 | 12/1993 | |
| JP | 06-251624 | 9/1994 | |
| JP | 06-251625 | 9/1994 | |
| JP | 7021850 A | 1/1995 | |
| JP | 08-059720 A | 3/1996 | |
| JP | 09-306265 | 11/1997 | |
| JP | H10-259212 A | 9/1998 | |
| JP | 10-283851 | 10/1998 | |
| JP | 2000-053815 A | 2/2000 | |
| JP | 2001-325834 A | 5/2000 | |
| JP | 2001-04148 | 2/2001 | |
| JP | 2001-501660 | 2/2001 | |
| JP | 2006291022 A | 10/2006 | |
| WO | 93/08222 A1 | 4/1993 | |
| WO | 1998014537 | 4/1998 | |
| WO | 99/20690 A1 | 4/1999 | |
| WO | 00/25324 A1 | 5/2000 | |
| WO | 2001/037289 A1 | 5/2001 | |
| WO | 2003/000754 A1 | 1/2003 | |
| WO | 2004/041919 A2 | 5/2004 | |
| WO | 2006/081400 A2 | 8/2006 | |
| WO | 2006/089744 A1 | 8/2006 | |
| WO | 2006-089793 A1 | 8/2006 | |
| WO | 2006131266 | 12/2006 | |
| WO | 20061131264 A1 | 12/2006 | |
| WO | 2008/070022 A1 | 6/2008 | |
| WO | 2009000326 | 12/2008 | |
| WO | 2009002653 | 12/2008 | |
| WO | 2009007116 A1 | 1/2009 | |
| WO | 2009007117 A1 | 1/2009 | |
| WO | 2009007118 A1 | 1/2009 | |
| WO | 2009007119 A2 | 1/2009 | |
| WO | 2009012041 | 1/2009 | |
| WO | 2009012092 | 1/2009 | |
| WO | 2009056409 | 5/2009 | |
| WO | 2010003650 | 1/2010 | |
| WO | WO 2010/003649 A1 | 1/2010 | |
| WO | 2011057926 | 5/2011 | |
| WO | 2011057927 | 5/2011 | |
| WO | WO 2011/057928 A1 | 5/2011 | |

OTHER PUBLICATIONS

International Search Report and Written Opinion dated Dec. 6, 2010 for International Application No. PCT/EP2010/066711.
International Search Report and Written Opinion dated Nov. 30, 2010 for International Application No. PCT/EP2010/066709.
International Search Report dated Apr. 26, 2012 for International Application No. PCT/EP2011/069182.
International Search Report dated Dec. 9, 2010 for International Application No. PCT/EP2010/066710.
Smedberg et al. "Effect of molecular structure and topology on network formation in peroxide crosslinked polyethylene", Polymer 44 (2003) 3395-3405.
International Search Report for PCT/EP2011/053025, dated Aug. 11, 2011.
Shamiri et al., "The influence of Ziegler-Natta and metallocene Catalysts on Polyolefin structure, properties, and processing ability," Materials 7 (2014) 5069-5108.
Machine translation of JP 2001-501660A; publication date Feb. 2001.
Primol 352 Product Information Sheet, 3 pages (Copyright 2001-2014 Exxon Mobile Corp.
Communication dated Aug. 19, 2015 for EP Application 10771773.8.
Office Action dated Jan. 5, 2015 for JP2013-537116 (English translation).
Communication of a Notice of Opposition dated Dec. 16, 2015 for EP 10771774.6.
Declaration and Test Report on Carbon-Carbon Unsaturation of DXM-446 LDPE of Dr Timothy J. Person dated Dec. 8, 2015.
Test Report on Preparing the Plaques for Electrical Conductivity Testing dated Dec. 7, 2015.
Test Report Shanghai Electric Cable Institute R&D Center—English Version.
Olsson et al., Experimental Determination of DC Conductivity for XPLE Insulation, Nordic Insulation Symposium 2009 (Nord-IS 09), Jun. 15, 2009, 55-58.
R. Bodega, Space Charge Accumulation in Polymeric High Voltage DC Cable Systems, Thesis, Technical University Delft, ISBN 90-8559-228-3, 2006 pp. vii-xii, 9-12, 75-89.
Global high voltage solutions, Dow Wire & Cable, Published Aug. 2008, The Dow Chemical Company.
Declaration of Dr Timothy J. Person dated Oct. 6, 2015 with attachments including (1) the invoice 09/45106196 of Aug. 7, 2008, (2) the certificate of analysis 3802244 dated Aug. 7, 2008, (3) the invoice 09/45105512 of Jul. 24, 2008 and (4) the certificate of analysis 3783325 dated Jul. 24, 2008.
Declaration of Mr Kent Neuvar with attachment dated Oct. 6, 2015 including MSDS Ideal EC 631.
Experimental report by Dr Dachao Li dated Oct. 6, 2015.
Rudnick, Leslie and Ronald Shukbin, Synthetic Lubricants and High-performance Functional fluids, Revised and Expanded, CRC Press, 1999, p. 376-377.
Communication of a Notice of Opposition dated Oct. 19, 2015 for EP 10773622.5.
Andersson et al., "Comparison of test setups for high field conductivity of HVDC insulation Materials", Nordic Insulation Symposium—Nord-IS 13—Trondheim, Norway, Jun. 9-12, 2013.
Bremner et al., "Effects of Polyethylene Molecular Structure on Peroxide Crosslinking of Low Density Polyethylene", Polymer Engineering and Science, Jul. 1992, 32 (14), 939-943.
Chen et al., "ac aging and space-charge characteristics in low-density polyethylene polymeric insulation", Journal of Applied Physics, 97, 83713, 2005, pp. 1-7.
Ghorbani, "Characterization of Conduction and Polarization Properties of HVDC Cable XLPE Insulation Materials", Licentiate Thesis, Stockholm, Sweden 2016 (first 4 pages and section 4.3 on pp. 40 to 45).
Hirai et al., "Chemical Group in Crosslinking Byproducts Responsible for Charge Trapping in Polyethylene", IEEE Transactions in Dielectrics and Electrical Insulation, 10(2), Apr. 2003, 320-330.
Page 1 of AN51 Test Method for Measurement of Hot Creep of Polymeric Insulations T-28-562.
Peacock, "Handbook of Polyethylene, Structures, Properties, and Applications", Marcel Dekker, Inc, New York, 2000, pp. 210-217.
Person, Experimental Report on Conductivity Tests of Various Copolymer Compositions, dated Sep. 7, 2018.
Smedberg et al., "Characterisation and crosslinking properties of a poly(ethylene-co-divinylsiloxane)", Polymer 45 (2004), 4845-4855.

(56) References Cited

OTHER PUBLICATIONS

Smedberg et al., "The role of entanglements in network formation in unsaturated low density polyethylene", Polymer 45 (2004), 4867-4875.

* cited by examiner

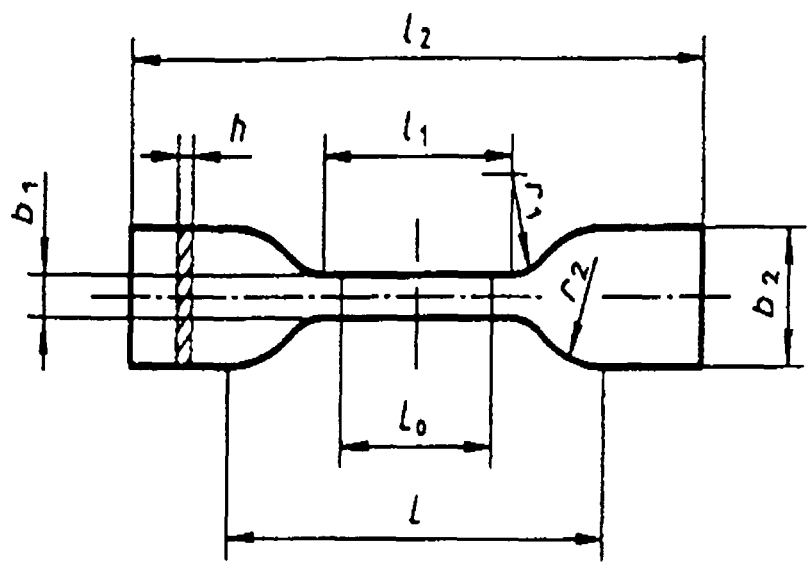

CROSSLINKABLE POLYMER COMPOSITION AND CABLE WITH ADVANTAGEOUS ELECTRICAL PROPERTIES

CROSS REFERENCE TO RELATED APPLICATIONS

This application is the U.S. National Phase of International Application No. PCT/EP2010/066712, filed Nov. 3, 2010, designating the U.S. and published as WO 2011/057928 on May 19, 2011 which claims the benefit of European Patent Application No. 09175688.2 filed Nov. 11, 2009.

FIELD OF INVENTION

The invention relates to a polymer composition comprising a polyolefin, a method for reducing the electrical conductivity of a crosslinked polymer composition, a process for producing a crosslinkable and crosslinked article, a crosslinkable and crosslinked power cable, more preferably a crosslinkable and crosslinked direct current (DC) power cable, comprising the polymer composition, as well as the use of the polyolefin composition in a power cable layer.

BACKGROUND ART

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition has a significant importance. Furthermore, the electrical properties of importance may differ in different cable applications, as is the case between alternating current (AC) and direct current (DC) cable applications.

Crosslinking of Cables

A typical power cable comprises a conductor surrounded, at least, by an inner semiconductive layer, an insulation layer and an outer semiconductive layer, in that order. The cables are commonly produced by extruding the layers on a conductor. The polymer material in one or more of said layers is then normally crosslinked to improve e.g. heat and deformation resistance, creep properties, mechanical strength, chemical resistance and abrasion resistance of the polymer in the layer(s) of the cable. In crosslinking reaction of a polymer interpolymer crosslinks (bridges) are primarily formed. Crosslinking can be effected using e.g. a free radical generating compound, such as a peroxide. Free radical generating agent is typically incorporated to the layer material prior to the extrusion of the layer(s) on a conductor. After formation of the layered cable, the cable is then subjected to a crosslinking step to initiate the radical formation and thereby crosslinking reaction.

Peroxides are very common free radical generating compounds used i.a. in the polymer industry for said polymer modifications. The resulting decomposition products of peroxides may include volatile by-products which are undesired, since they can be hazardous and may have a negative influence on the electrical properties of the cable. Therefore the volatile decomposition products such as methane e.g. where dicumylperoxide is used, are conventionally reduced to a minimum or removed after crosslinking and cooling step. Such removal step is generally known as a degassing step. The degassing step is time and energy consuming and is thus a costly operation in a cable manufacturing process.

Also the used cable production line and desired production speed can bring limitations to the cable materials especially when producing power cables of a larger size. Moreover, i.a. the crosslinking rate and the crosslinking degree of the polymer in the cable layer should be sufficient in order to minimize or avoid any undesirable sagging problem occurring during the cable production, particularly when the cable is produced e.g. in a catenary continuous vulcanization (CCV) line (especially for thicker constructions), which is a well known vulcanisation line type in the field and described in the literature.

Electrical Conductivity

The DC electrical conductivity is an important material property e.g. for insulating materials for high voltage direct current (HV DC) cables. First of all, the strong temperature and electric field dependence of this property will influence the electric field. The second issue is the fact that heat will be generated inside the insulation by the electric leakage current flowing between the inner and outer semiconductive layers. This leakage current depends on the electric field and the electrical conductivity of the insulation. High conductivity of the insulating material can even lead to thermal runaway under high stress/high temperature conditions. The conductivity must therefore be sufficiently low to avoid thermal runaway.

Accordingly, in HV DC cables, the insulation is heated by the leakage current. For a specific cable design the heating is proportional to the insulation conductivity×(electrical field)$^2$. Thus, if the voltage is increased, far more heat will be generated.

There are high demands to increase the voltage of a power cable, preferably of direct current DC power cable, and thus a continuous need to find alternative polymer compositions with reduced conductivity. Such polymer compositions should preferably also have good mechanical properties required for demanding power cable embodiments.

SUMMARY

One of the objects of the present invention is to provide an alternative crosslinked polymer composition which comprises a polyolefin and which has surprisingly advantageous properties suitable for a DC power cable.

A further object of the invention is to provide a method for reducing electrical conductivity, i.e. for providing low electrical conductivity, of a crosslinked polymer composition, preferably of crosslinked polymer composition present in at least an insulation layer of a crosslinked power cable, preferably of a crosslinked direct current (DC) power cable.

Another object of the invention is to provide a crosslinked power cable, preferably a direct current (DC) power cable, wherein at least one layer comprises a crosslinked polymer composition which has surprisingly advantageous properties.

The invention and further objects and benefits thereof are described and defined in details below.

BRIEF DESCRIPTION OF THE DRAWINGS

FIG. 1 illustrates the sample geometry used in the tensile testing.

DESCRIPTION OF CERTAIN ILLUSTRATIVE EMBODIMENTS

The present invention provides a crosslinkable polymer composition comprising a polyolefin and peroxide, whereby the amount of the peroxide is of less than 35 mmol —O—O—/kg polymer composition.

"Crosslinkable" means that the cable layer can be crosslinked before the use in the end application thereof. Crosslinkable polymer composition comprises the polyolefin and the peroxide in an amount as defined above, below or in claims. Moreover, the crosslinked polymer composition or, respectively, the crosslinked polyolefin, is crosslinked via radical reaction using the claimed amount of peroxide present in the polymer composition before crosslinking. The crosslinked polymer composition has a typical network, i.a. interpolymer crosslinks (bridges), as well known in the field. As evident for a skilled person, the crosslinked polymer can be and is defined herein with features that are present in the polymer composition or polyolefin before or after the crosslinking, as stated or evident from the context. For instance the presence and the amount of the peroxide in the polymer composition or the type and compositional property, such as MFR, density and/or unsaturation degree, of the polyolefin component are defined, unless otherwise stated, before crosslinking, and the features after the crosslinking are e.g. the electrical conductivity, crosslinking degree or mechanical properties measured from the crosslinked polymer composition.

The present invention further provides a crosslinked polymer composition comprising a crosslinked polyolefin, wherein the polymer composition comprises prior to crosslinking (i.e. before it is crosslinked) a polyolefin and peroxide, whereby the amount of the peroxide is of less than 35 mmol —O—O—/kg polymer composition.

Accordingly, the present crosslinked polymer composition is preferred and is obtainable by crosslinking with an amount of peroxide as defined above or below.

The present invention further provides a crosslinked polymer composition comprising a polyolefin which is crosslinked with peroxide used in an amount of less than 35 mmol —O—O—/kg polymer composition.

The expressions "obtainable by crosslinking", "crosslinked with" and "crosslinked polymer composition" are used herein interchangeably and mean the category "product-by-process", i.e. that the product has a technical feature which is due to the crosslinking step as will be explained below.

The unit "mmol —O—O—/kg polymer composition" means herein the content (mmol) of peroxide functional groups per kg polymer composition, when measured from the polymer composition prior to crosslinking. For instance the 35 mmol —O—O—/kg polymer composition corresponds to 0.95 wt % of the well known dicumyl peroxide based on the total amount (100 wt %) of the polymer composition.

The "crosslinked polymer composition" is referred herein below also shortly as "Polymer composition" or "polymer composition". Also the "crosslinkable polymer composition" is referred herein below also shortly as "Polymer composition" or "polymer composition". The meaning is evident from the context.

Unexpectedly, electrical conductivity of a polymer composition is reduced, i.e. lower, when crosslinked using a peroxide (e.g. a well known dicumyl peroxide) in a low amount as defined above or below, compared to the electrical conductivity obtained after crosslinking the same polymer material using the same peroxide, but in typical amounts of 37 to 55 mmol —O—O—/kg polymer composition, which corresponds to 1.0 to 2.5 wt % of dicumyl peroxide, conventionally used for crosslinking of power cables.

The polymer composition of the invention has electrical properties expressed i.a. as reduced, i.e. low, electrical conductivity, whereby the undesired heat formation, e.g. in the insulation layer of a power cable, preferably of a DC power cable, can be minimised. The invention is particularly advantageous for DC power cables.

The electrical conductivity is measured herein according to DC conductivity method as described under "Determination Methods". "Reduced" or "low" electrical conductivity as used herein interchangeably mean that the value obtained from the DC conductivity method is low, i.e. reduced.

The low electrical conductivity of the Polymer composition is very advantageous i.a. in a power cable, preferably in an AC or DC power cable, preferably in direct current (DC) power cables, more preferably in low voltage (LV), medium voltage (MV), high voltage (HV) or extra high voltage (EHV) DC cables, more preferably in DC power cables operating at any voltages, preferably at higher than 36 kV, such as HV DC cables.

Moreover, the electrical conductivity of the Polymer composition is surprisingly low even without removing the volatile by-products after crosslinking, i.e. without degassing, compared to electrical conductivity of a non-degassed polymer composition crosslinked with conventional amounts of peroxide. Therefore, if desired, the degassing step of the crosslinked cable containing the Polymer composition can be considerably shortened and/or effected in less demanding conditions during cable production process which naturally improves the production efficiency. Accordingly, if desired the degassing step during the cable production can be shortened.

The invention is further directed to a method for reducing, i.e. providing low, electrical conductivity of a crosslinked polymer composition comprising a polyolefin crosslinked with peroxide, wherein the method comprises a step of producing the crosslinked polyolefin by crosslinking the polyolefin with an amount of peroxide of less than 35 mmol —O—O—/kg polymer composition.

More preferably the invention is directed to a method for reducing the electrical conductivity of a crosslinked polymer composition of a crosslinked power cable, preferably of a crosslinked direct current (DC) power cable, more preferably of a crosslinked HV or EHV DC power cable, comprising a conductor which is surrounded by at least an insulation layer, preferably at least by an inner semiconductive layer, an insulation layer and an outer semiconductive layer, in that order, wherein at least the insulation layer comprises a polymer composition comprising a polyolefin crosslinked with a peroxide, wherein the method comprises a step of producing the crosslinked polyolefin by crosslinking the polyolefin with an amount of peroxide of less than 35 mmol —O—O—/kg polymer composition. In this method it is preferred to use the Polymer composition as defined above or below.

Accordingly, the invention further provides a crosslinkable power cable, preferably a crosslinkable direct current (DC) power cable, comprising a conductor surrounded by one or more layers, wherein at least one of said layer(s) comprises a polymer composition comprising a crosslinkable polyolefin and a peroxide in an amount of less than 35 mmol —O—O—/kg polymer composition. More preferably, the invention is directed to a crosslinkable power cable, preferably to a crosslinkable direct current (DC) power cable, more preferably to a crosslinkable HV or EHV DC power cable, comprising a conductor surrounded by at least an inner semiconductive layer, an insulation layer and an outer semiconductive layer, in that order, wherein at least one layer, preferably the insulation layer, comprises a crosslinkable polymer composition of the invention comprising a polyolefin and peroxide in an amount of less than 35 mmol —O—O—/kg polymer composition.

The invention is further directed to a crosslinked power cable, preferably to a crosslinked direct current (DC) power cable, comprising a conductor surrounded by one or more layers, wherein at least one of said layer(s) comprises a crosslinked polymer composition comprising a polyolefin crosslinked with peroxide in an amount of less than 35 mmol —O—O—/kg polymer composition. More preferably, the invention is directed to a crosslinked power cable, preferably to a crosslinked direct current (DC) power cable, more preferably to a crosslinked HV or EHV DC power cable, comprising a conductor surrounded by at least an inner semiconductive layer, an insulation layer and an outer semiconductive layer, in that order, wherein at least one layer, preferably the insulation layer, comprises a crosslinked polymer composition comprising a polyolefin crosslinked with peroxide in an amount of less than 35 mmol —O—O—/kg polymer composition. The expression in the crosslinked cable of "polyolefin crosslinked with peroxide in an amount of less than 35 mmol —O—O—/kg polymer composition" means that the polymer composition before crosslinking contains the polyolefin and peroxide in an amount of less than 35 mmol —O—O—/kg polymer composition.

The below preferable subgroups, properties and embodiments of the polymer composition apply equally and independently to the polymer composition as such, as well as to the polymer composition of the invention in the method for reducing electrical conductivity, in the crosslinkable cable and in the crosslinked cable, as defined above or below.

More preferably, the crosslinked polymer composition of the invention, prior to crosslinking, comprises said peroxide in amount of 34 mmol —O—O—/kg polymer composition or less, preferably of 33 mmol —O—O—/kg polymer composition or less, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition, even more preferably from 15 to 30 mmol —O—O—/kg polymer composition. The peroxide content depends on the desired crosslinking level and in one embodiment the peroxide content prior crosslinking is desired to be even preferably 17 to 29 mmol —O—O—/kg polymer composition. Furthermore, the polyolefin may be unsaturated, whereby the peroxide content may depend on the unsaturation degree.

In case the cable is produced in a catenary continuous vulcanization cable line, then before the crosslinking, the polymer composition preferably comprises peroxide in an amount of 7 mmol —O—O—/kg polymer composition or more, preferably from 15 to 30.0 mmol —O—O—/kg polymer composition.

More preferably, the crosslinked polymer composition of the invention has after the crosslinking an electrical conductivity of 45 fS/m or less, when measured according to DC conductivity method as described under "Determination Methods". The crosslinked polymer composition of the invention has preferably an electrical conductivity of 40 fS/m or less, more preferably from 0.01 to 38 fS/m, even more preferably from 0.5 to 35 fS/m, when measured according to DC conductivity method as described under "Determination Methods".

In one preferable embodiment the Polymer composition of the invention comprises preferably a crosslinked low density polyethylene (LDPE) polymer as defined later below including the preferable subgroups and embodiments thereof and has an electrical conductivity from 1 to 45 fS/m, preferably from 1 to 40 fS/m, preferably from 1 to 38 fS/m, more preferably from 1 to 38 fS/m, when measured according to DC conductivity method as described under "Determination Methods".

Further unexpectedly, the peroxide content can be reduced without sacrificing mechanical properties of the obtained crosslinked polymer composition which are important for power cable layers. Thus unexpectedly, in addition to reduced electrical conductivity of the Polymer composition, also one or more, more preferably all, of the mechanical properties selected from PENT (Pennsylvania Notch Test) and Tensile properties expressed as Stress at Break and/or Strain at Break, remain in feasible or at least similar level as the mechanical properties of the prior art crosslinked polymer compositions used in the cable layers. The reason for the advantageous balance between improved electrical conductivity and good mechanical properties is not fully understood. Without binding to any theory one of the reasons may be that an unexpectedly high degree of crystallinity (%) of the crosslinked polymer is maintained compared to the degree of crystallinity obtained with conventional concentrations of peroxide. Accordingly and further preferably the polymer composition of the invention has an unexpected balance between electrical and mechanical properties, which is very advantageous e.g. for DC power cables and, surprisingly, also for HV or EHV DC power cables.

Accordingly, the crosslinked polymer composition of the invention has further preferably a PENT life time of 200 hours or more, preferably of 400 hours or more, preferably 500 hours or more, more preferably of 800 hours or more, more preferably of 1000 hours or more, when measured according to PENT test under load at 2 MPa and at ageing temperature of 70° C. as described under "Determination methods". PENT indicates the resistance to slow crack propagation and the higher the value the better is said resistance.

Further preferably, the crosslinked polymer composition of the invention has advantageous tensile properties which are expressed herein as Stress at Break or Strain at Break each of which are defined at two temperatures.

Preferably the crosslinked polymer composition of the invention has Stress at Break at 70° C. of 7.0 MPa or more, preferably of 10.0 MPa or more, more preferably of 12.0 MPa or more, or at −10° C. of 25.0 MPa or more, preferably of 26.0 MPa or more, preferably of 30.0 MPa or more. More preferably the crosslinked polymer composition has a Stress at Break at 70° C. as defined above and a Stress at Break at −10° C. as defined above, when measured according to Tensile test method as described under "Determination methods". The upper limit of Stress at Break is not limited and can be e.g. 25.0 MPa at 70° C. and e.g. 50.0 MPa at −10° C.

Further preferably, the crosslinked polymer composition of the invention has a Strain at break (%) at 70° C. of 350% or more, preferably of 400% or more, preferably of 450% or more, or at −10° C. of 400% or more. More preferably the crosslinked polymer composition has a Strain at Break (%) at 70° C. as defined above and a Strain at break (%) at −10° C. as defined above, when measured according to Tensile test method as described under "Determination methods". The upper limit of Strain at Break is not limited and can be e.g. 1000% at 70° C. and e.g. 800% at −10° C.

Even further preferably, the Polymer composition has both Stress at Break at 70° C. and at −10° C. as well as Strain at Break at 70° C. and at −10° C. as defined above.

The crosslinked polymer composition of the invention has preferably a gel content of at least 10 wt % (weight-%), preferably of at least 28 wt %, preferably of at least 35 wt %, preferably of at least 40 wt %, more preferably of at least 45 wt %, more preferably of at least 50 wt %, more preferably of at least 55 wt %, when measured according to ASTM D 2765-01, Method A, using decaline extraction as described under "Determination methods".

In one preferable embodiment the polymer composition is crosslinked using peroxide in an amount of 7.0 mmol —O—O—/kg polymer composition or more (0.2 wt %) and has a gel content of at least 10 wt %, preferably of 15 mmol —O—O—/kg polymer composition or more (0.4 wt %) and has a gel content of at least 30 wt %, preferably in an amount from 19 to 30 mmol —O—O—/kg polymer composition (0.5-0.8 wt %) and has a gel content of at least 30 wt %, preferably of at least 50 wt %, when measured according to ASTM D 2765-01, Method A, using decaline extraction.

Accordingly, the crosslinked polymer composition of the invention is used for determining the above electrical, mechanical and crosslinking degree properties thereof. The respective sample preparation of the crosslinked polymer composition is described below under the "Determination methods".

The invention is directed also to a process for producing a crosslinkable and crosslinked power cable, preferably a crosslinkable and crosslinked direct current (DC) power cable, as defined above or below.

The further preferable subgroups of the above properties, further properties, variants and embodiments as defined above or below for the Polymer composition or for the components thereof apply similarly to the method for reducing electrical conductivity, to the power cable, preferably to the DC power cable, of the invention.

Polyolefin Component

The following preferable embodiments, properties and subgroups of the polyolefin component suitable for the Polymer composition are generalisable so that they can be used in any order or combination to further define the preferable embodiments of the Polymer composition. Moreover, it is evident that the given description applies to the polyolefin before it is crosslinked.

The term polyolefin means both an olefin homopolymer and a copolymer of an olefin with one or more comonomer(s). As well known "comonomer" refers to copolymerisable comonomer units.

The polyolefin can be any polyolefin, such as any conventional polyolefin, which is suitable as a polymer in a layer, preferably an insulating layer, of an electrical cable, preferably of a power cable.

The polyolefin can be e.g. a commercially available polymer or can be prepared according to or analogously to known polymerization process described in the chemical literature.

More preferably the polyolefin is a polyethylene produced in a high pressure process, more preferably a low density polyethylene LDPE produced in a high pressure process. The meaning of LDPE polymer is well known and documented in the literature. Although the term LDPE is an abbreviation for low density polyethylene, the term is understood not to limit the density range, but covers the LDPE-like HP polyethylenes with low, medium and higher densities. The term LDPE describes and distinguishes only the nature of HP polyethylene with typical features, such as different branching architecture, compared to the PE produced in the presence of an olefin polymerisation catalyst.

The LDPE as said polyolefin may be a low density homopolymer of ethylene (referred herein as LDPE homopolymer) or a low density copolymer of ethylene with one or more comonomer(s) (referred herein as LDPE copolymer). The one or more comonomers of LDPE copolymer are preferably selected from the polar comonomer(s), non-polar comonomer(s) or from a mixture of the polar comonomer(s) and non-polar comonomer(s), as defined above or below. Moreover, said LDPE homopolymer or LDPE copolymer as said polyolefin may optionally be unsaturated.

As a polar comonomer for the LDPE copolymer as said polyolefin, comonomer(s) containing hydroxyl group(s), alkoxy group(s), carbonyl group(s), carboxyl group(s), ether group(s) or ester group(s), or a mixture thereof, can be used. More preferably, comonomer(s) containing carboxyl and/or ester group(s) are used as said polar comonomer. Still more preferably, the polar comonomer(s) of LDPE copolymer is selected from the groups of acrylate(s), methacrylate(s) or acetate(s), or any mixtures thereof. If present in said LDPE copolymer, the polar comonomer(s) is preferably selected from the group of alkyl acrylates, alkyl methacrylates or vinyl acetate, or a mixture thereof. Further preferably, said polar comonomers are selected from $C_1$- to $C_6$-alkyl acrylates, $C_1$- to $C_6$-alkyl methacrylates or vinyl acetate. Still more preferably, said polar LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer as said polyolefin, comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, monounsaturated (=one double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it preferably comprises 0.001 to 50 wt.-%, more preferably 0.05 to 40 wt.-%, still more preferably less than 35 wt.-%, still more preferably less than 30 wt.-%, more preferably less than 25 wt.-%, of one or more comonomer(s).

The Polymer composition, preferably the polyolefin component thereof, more preferably the LDPE polymer, may optionally be unsaturated, i.e. the polymer composition, preferably the polyolefin, preferably the LDPE polymer, may comprise carbon-carbon double bonds. The "unsaturated" means herein that the polymer composition, preferably the polyolefin, contains carbon-carbon double bonds/1000 carbon atoms in a total amount of at least 0.4/1000 carbon atoms.

As well known, the unsaturation can be provided to the Polymer composition i.a. by means of the polyolefin, a low molecular weight (Mw) compound(s), such as crosslinking booster(s) or scorch retarder additive(s), or any combinations thereof. The total amount of double bonds means herein double bonds determined from the source(s) that are known and deliberately added to contribute to the unsaturation. If two or more above sources of double bonds are chosen to be used for providing the unsaturation, then the total amount of double bonds in the Polymer composition means the sum of the double bonds present in the double-bond sources. It is evident that a characteristic model compound for calibration is used for each chosen source to enable the quantitative infrared (FTIR) determination.

Any double bond measurements are carried out prior to crosslinking.

If the polymer composition is unsaturated prior to crosslinking, then it is preferred that the unsaturation originates at least from an unsaturated polyolefin component. More preferably, the unsaturated polyolefin is an unsaturated polyethylene, more preferably an unsaturated LDPE polymer, even more preferably an unsaturated LDPE homopolymer or an unsaturated LDPE copolymer. When polyunsaturated comonomer(s) are present in the LDPE polymer as said unsaturated polyolefin, then the LDPE polymer is an unsaturated LDPE copolymer.

In a preferred embodiment the term "total amount of carbon-carbon double bonds" is defined from the unsaturated polyolefin, and refers, if not otherwise specified, to the combined amount of double bonds which originate from vinyl groups, vinylidene groups and trans-vinylene groups, if present. Naturally the polyolefin does not necessarily contain all the above three types of double bonds. However, any of the three types, when present, is calculated to the "total amount of carbon-carbon double bonds". The amount of each type of double bond is measured as indicated under "Determination methods".

If an LDPE homopolymer is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is preferably an unsaturated LDPE copolymer of ethylene with at least one polyunsaturated comonomer, and optionally with other comonomer(s), such as polar comonomer(s) which is preferably selected from acrylate or acetate comonomer(s). More preferably an unsaturated LDPE copolymer is an unsaturated LDPE copolymer of ethylene with at least polyunsaturated comonomer(s).

The polyunsaturated comonomers suitable for the unsaturated polyolefin preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the C—C double bonds, preferably to the total amount of the vinyl groups. Herein, when a compound which can also act as comonomer, such as propylene, is used as CTA for providing double bonds, then said copolymerisable comonomer is not calculated to the comonomer content.

If the polyolefin, more preferably the LDPE polymer, is unsaturated, then it has preferably a total amount of carbon-carbon double bonds, which originate from vinyl groups, vinylidene groups and trans-vinylene groups, if present, of more than 0.5/1000 carbon atoms. The upper limit of the amount of carbon-carbon double bonds present in the polyolefin is not limited and may preferably be less than 5.0/1000 carbon atoms, preferably less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, is preferably higher than 0.50/1000 carbon atoms, preferably higher than 0.60/1000 carbon atoms. Such higher amount of double bonds is preferable e.g. if high cable production speed is desired and/or it would be desirable to minimise or to avoid sagging problems which may occur e.g. depending on the desired end application and/or the cable production process. Higher double bond content combined with "low" peroxide content of the invention is also preferred in cable embodiments, such as in DC power cables, where very demanding mechanical and/or heat resistance properties are needed for the layer, preferably insulation layer, material.

More preferably the polyolefin is unsaturated and contains at least vinyl groups and the total amount of vinyl groups is preferably higher than 0.05/1000 carbon atoms, still more preferably higher than 0.08/1000 carbon atoms, and most preferably of higher than 0.11/1000 carbon atoms. Preferably, the total amount of vinyl groups is of lower than 4.0/1000 carbon atoms. More preferably, the polyolefin, prior to crosslinking, contains vinyl groups in total amount of more than 0.20/1000 carbon atoms, still more preferably of more than 0.30/1000 carbon atoms, and most preferably of more than 0.40/1000 carbon atoms. In some demanding embodiments, preferably in power cables, more preferably in DC power cables, at least one layer, preferably the insulation layer, comprises LDPE polymer, preferably LDPE copolymer, which contains vinyl groups in total amount of more than 0.50/1000 carbon atoms.

Unexpectedly the unsaturation further contributes to said desirable balance of low conductivity and mechanical properties. In the preferred embodiment the polyolefin of the Polymer composition is an unsaturated LDPE copolymer of ethylene with at least one polyunsaturated comonomer, preferably a diene as defined above, and optionally with other comonomer(s), and has the total amount of carbon-carbon double bonds, which originate from vinyl groups, vinylidene groups and trans-vinylene groups, if present, as defined above, preferably has the total amount of vinyl groups as defined above. Said unsaturated LDPE copolymer is highly usable for the method for further reducing the electrical conductivity of a crosslinked polymer composition, preferable of an insulation layer of a power cable, preferably of a DC power cable.

Typically, and preferably in wire and cable (W&C) applications, the density of the polyolefin, preferably of the LDPE polymer, is higher than 860 kg/m$^3$. Preferably the density of the polyolefin, preferably of the LDPE polymer, the ethylene homo- or copolymer is not higher than 960 kg/m$^3$, and preferably is from 900 to 945 kg/m$^3$. The MFR$_2$ (2.16 kg, 190° C.) of the polyolefin, preferably of the LDPE polymer, is preferably from 0.01 to 50 g/10 min, more preferably is from 0.1 to 20 g/10 min, and most preferably is from 0.2 to 10 g/10 min.

Accordingly, the polyolefin of the invention is preferably produced at high pressure by free radical initiated polymerisation (referred to as high pressure (HP) radical polymerization). The HP reactor can be e.g. a well known tubular or autoclave reactor or a mixture thereof, preferably a tubular reactor. The preferred polyolefin is optionally, and preferably, unsaturated LDPE homopolymer or LDPE copolymer of ethylene with one or more comonomer(s), as defined above. The LDPE polymer obtainable by the process of the invention preferably provides the advantageous electrical properties as defined above or below. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

After the separation the obtained polymer is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner to result in the Polymer composition.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

When an unsaturated LDPE copolymer of ethylene is prepared, then, as well known, the C—C double bond content can be adjusted by polymerising the ethylene e.g. in the presence of one or more polyunsaturated comonomer(s), chain transfer agent(s), process conditions, or any combinations thereof, e.g. using the desired feed ratio between monomer, preferably ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes.

Polymer Composition

Prior to crosslinking the polymer composition comprises at least one peroxide which contains at least one —O—O— bond. Naturally, in case where two or more different peroxide products are used in the polymer composition, then amount (in mmol) of —O—O—/kg polymer composition as defined above, below or in claims is the sum of the amount of —O—O—/kg polymer composition of each peroxide product. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethyl-hexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof, can be mentioned. Preferably, the peroxides selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof. Most preferably, the peroxide is dicumylperoxide.

Additionally, prior to crosslinking the polymer composition of the invention may contain, in addition to the polyolefin and the peroxide, further component(s) such as polymer component(s) and/or additive(s), preferably additive(s), such as antioxidant(s), scorch retarder(s) (SR), crosslinking booster(s), stabiliser(s), processing aid(s), flame retardant additive(s), water tree retardant additive(s), acid or ion scavenger(s), inorganic filler(s) and voltage stabilizer(s), as known in the polymer field. The Polymer composition comprises preferably conventionally used additive(s) for W&C applications, such as one or more antioxidant(s) and optionally one or more scorch retarder(s), preferably at least one or more antioxidant(s). The used amounts of additives are conventional and well known to a skilled person, e.g. as already described above under "Description of the invention".

The Polymer composition of the invention comprises typically at least 50 wt %, preferably at least 60 wt %, more preferably at least 70 wt %, more preferably at least 75 wt %, more preferably from 80 to 100 wt % and more preferably from 85 to 100 wt %, of the polyolefin based on the total weight of the polymer component(s) present in the Polymer composition. The preferred Polymer composition consists of polyolefin as the only polymer component. The expression means that the Polymer composition does not contain further polymer components, but the polyolefin as the sole polymer component. However, it is to be understood herein that the Polymer composition may comprise further components other than polymer components, such as additives which may optionally be added in a mixture with a carrier polymer, i.e. in so called master batch.

The Polymer composition preferably consist of the polyolefin, preferably polyethylene, more preferably LDPE homo or copolymer, which may optionally, and preferably, be unsaturated before crosslinking, as the sole polyolefin component.

End Uses and End Applications of the Invention

The new Polymer composition of the invention is highly useful in wide variety of end applications of polymers. The preferred use of the Polymer composition is in W&C applications, more preferably in one or more layers of a power cable.

A power cable is defined to be a cable transferring energy operating at any voltage, typically operating at voltages higher than 1 kV. The voltage applied to the power cable can be alternating (AC), direct (DC), or transient (impulse). The polymer composition of the invention is very suitable for power cables operating at voltages higher than 36 kV, such cables cover high voltage (HV) and extra high voltage (EHV) power cables which EHV cables operate even at much higher voltages, as well known in the field. The above terms have well known meanings and thus indicate the operating level of such cables. For HV and EHV DC power cables the operating voltage is defined herein as the electric voltage between ground and the conductor of the high voltage cable. Typically a HV DC power cable and EHV DC power cable operate at voltages of 40 kV or higher, even at voltages of 50 kV or higher. A power cable operating at very high voltages is known in the art as EHV DC power cable which in practice can be as high as, but not limited to, 900 kV.

The Polymer composition is highly suitable for use as a layer material for a AC or DC power cable, preferably for a direct current (DC) power cable, more preferably for a DC power cable operating at voltages at higher than 36 kV, such as well known HV or EHV DC power cable, as defined above.

A crosslinkable power cable, preferably a crosslinkable DC power cable, is provided comprising a conductor surrounded by one or more layers, preferably at least an insulation layer, more preferably at least an inner semiconductive layer, an insulation layer and an outer semiconductive layer, in that order, wherein at least one of said layer(s), preferably the insulation layer, comprises a polymer composition comprising a crosslinkable polyolefin and a peroxide in an amount of less than 35 mmol —O—O—/kg polymer composition, preferably of 34 mmol —O—O—/kg polymer composition or less, preferably of 33 mmol —O—O—/kg polymer composition or less, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition, even more preferably from 15 to 30 mmol —O—O—/kg polymer composition. Depending on the desired crosslinking level and unsaturation degree of the polymer composition, preferably of the polyolefin, the peroxide content of the polymer composition in some cases may be even more preferably from 17 to 29 mmol —O—O—/kg polymer composition. The insulation layer of the power cable, preferably of the DC power cable, preferably comprises said crosslinkable unsaturated LDPE copolymer as defined above.

The term "conductor" means herein above and below that the conductor comprises one or more wires. Moreover, the cable may comprise one or more such conductors. Preferably the conductor is an electrical conductor and comprises one or more metal wires.

As well known the cable can optionally comprise further layers, e.g. layers surrounding the insulation layer or, if present, the outer semiconductive layers, such as screen(s), a jacketing layer, other protective layer(s) or any combinations thereof.

The invention also provides a process for producing a power cable, preferably a crosslinkable power cable, more preferably a crosslinkable DC power cable, more preferably a crosslinkable HV or EHV DC power cable, as defined above or in claims comprising a conductor surrounded by one or more layers, preferably at least an insulation layer, more preferably at least an inner semiconductive layer, an insulation layer and an outer semiconductive layer, in that order, wherein the process comprises the steps of applying one or more layers on a conductor wherein at least one layer, preferably the insulation layer, comprises a crosslinkable polymer composition of the invention comprising a polyolefin and peroxide in an amount of less than 35 mmol —O—O—/kg polymer composition, preferably 34 mmol —O—O—/kg polymer composition or less, preferably of 33 mmol —O—O—/kg polymer composition or less, preferably of 30 mmol —O—O—/kg polymer composition or less, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition.

In the preferred embodiment of the power cable production process of the invention a crosslinkable power cable is produced by
(a) providing and mixing, preferably meltmixing in an extruder, said crosslinkable polymer composition of the invention as defined above or below in claims,
(b) applying at least a meltmix of the polymer composition obtained from step (a), preferably by (co)extrusion, on a conductor to form one or more layers, preferably at least an insulation layer, and
(c) optionally crosslinking at least the polymer composition of the invention in said at least one layer, preferably in the insulation layer.

More preferably in this embodiment a crosslinkable DC power cable, preferably a crosslinkable HV DC power cable, of the invention comprising a conductor surrounded by an inner semiconductive layer, an insulation layer, and an outer semiconductive layer, in that order, is produced, wherein the process comprises the steps of
(a) providing and mixing, preferably meltmixing in an extruder, a crosslinkable first semiconductive composition comprising a polymer, a carbon black and optionally further component(s) for the inner semiconductive layer,
   providing and mixing, preferably meltmixing in an extruder, a crosslinkable polymer composition of the invention for the insulation layer,
   providing and mixing, preferably meltmixing in an extruder, a second semiconductive composition which is preferably crosslinkable and comprises a polymer, a carbon black and optionally further component(s) for the outer semiconductive layer,
(b) applying on a conductor, preferably by coextrusion,
   a meltmix of the first semiconductive composition obtained from step (a) to form the inner semiconductive layer,
   a meltmix of polymer composition of the invention obtained from step (a) to form the insulation layer, and
   a meltmix of the second semiconductive composition obtained from step (a) to form the outer semiconductive layer, and
(c) optionally crosslinking at crosslinking conditions one or more of the polymer composition of the insulation layer, the semiconductive composition of the inner semiconductive layer and the semiconductive composition of the outer semiconductive layer, of the obtained cable, preferably at least the polymer composition of the insulation layer, more preferably the polymer composition of the insulation layer, the semiconductive composition of the inner semiconductive layer and the semiconductive composition of the outer semiconductive layer.

The polymer of the first and the second semiconductive composition is preferably a polyolefin as described in relation to the polymer composition of the invention. The carbon black can be any conventional carbon black used in the semiconductive layers of a power cable, preferably in the semiconductive layer of a DC power cable. Non-limiting examples of carbon blacks are any conventional conductive carbon black, such as furnace carbon black and acetylene carbon black. Moreover the first and second semiconductive compositions are preferably identical.

Melt mixing means mixing above the melting point of at least the major polymer component(s) of the obtained mixture and is typically carried out in a temperature of at least 10-15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polymer composition of the invention and the optional and preferred first and second semiconductive compositions can be produced before or during the cable production process. Moreover the polymer composition of the invention and the optional and preferred first and second semiconductive composition can each independently comprise part or all of the component(s) thereof before introducing to the (melt)mixing step a) of the cable production process.

The mixing step (a) of the provided polymer composition of the invention and of the preferable first and second semiconductive compositions is preferably carried out in a cable extruder. The step a) of the Cable production process may optionally comprise a separate mixing step, e.g. in a mixer arranged in connection and preceding the cable extruder of the Cable production line. Mixing in the preceding separate mixer can be carried out by mixing with or without external heating (heating with an external source) of the component(s). In case the peroxide(s) and part or all of the optional further component(s), such as further additive(s), of the polymer composition of the invention and of the optional and preferred first and second semiconductive compositions, are added to the polyolefin during the Cable production process, then the addition(s) can take place at any stage during the mixing step (a), e.g at the optional separate mixer preceding the cable extruder or at any point(s) of the cable extruder. The addition of peroxide and optional additive(s) can be made simultaneously or separately as such, preferably in liquid form, or in a well known master batch, and at any stage during the mixing step (a).

It is more preferred that the peroxide and preferably also the optional further component(s), such as additive(s), are already present in at least the polymer composition, before it is used in the cable production process and in the production line thereof. The peroxide can be provided to the pellets of the polyolefin or of the polymer composition before the pellets are provided to the step (a) of the process. The peroxide can be e.g. meltmixed together with the polyolefin and optional further component(s) and then the meltmix is pelletised, or, preferably, can be added, preferably impregnated, to the solid pellets of the polyolefin or of the polymer composition. The peroxide is preferably added in liquid state, i.e. it can be in liquid form at ambient temperature, or is preheated above the melting or glass transition point thereof or dissolved in a carrier medium, as well known to a skilled person. The addition of the optional additive(s) in this embodiment can be made as described above for the peroxide.

Preferably, said Polymer composition and the optional first and second semiconductive composition is used in form of powder, grain or pellets when provided to the cable production process. Pellets can be of any size and shape.

It is preferred that the meltmix of the Polymer composition obtained from meltmixing step consists of the polyolefin of the invention as the sole polymer component. The optional, and preferable, additive(s) can be added to Polymer composition as such or as a mixture with a carrier polymer, i.e. in a form of so-called master batch.

In a preferred embodiment of the cable production process, a crosslinkable power cable, preferably a crosslinkable DC power cable, more preferably a crosslinkable HV DC power cable, is produced, wherein the insulation layer comprises the polymer composition of the invention comprising a crosslinkable polyolefin, optionally, and preferably, unsaturated an LDPE homo or copolymer, and a peroxide in an amount as given above or below, and then the crosslinkable polyolefin in the insulation layer of the obtained cable is crosslinked in step c) in crosslinking conditions. More preferably in this embodiment, a crosslinked power cable, preferably a crosslinked DC power cable, more preferably a crosslinked HV DC power cable, is produced, which comprises a conductor surrounded by an inner semiconductive layer comprising, preferably consisting of, a first semiconductive composition, an insulation layer comprising, preferably consisting of, a polymer composition of the invention as defined above, and optionally, and preferably, an outer semiconductive layer comprising, preferably consisting of, a second semiconductive composition, wherein at least the polymer composition of the insulation layer, optionally and preferably at least one, preferably both, of the first and the second semiconductive composition the inner and, respectively, outer semiconductive layer, is crosslinked at crosslinking conditions in step (c). Crosslinking of the polymer composition of the insulation layer is carried out in the presence of a peroxide in an amount as defined above or in below claims, and the optional and preferable crosslinking of the first semiconductive composition of the inner semiconductive, is carried out in the presence of crosslinking agent(s), preferably in the presence of free radical generating agent(s), which is preferably a peroxide(s).

The crosslinking of the polymer composition of the insulation layer of the invention is thus carried out in the presence of the inventive "low amount" of the peroxide as defined above, below or in claims.

The crosslinking agent(s) can already be present in the optional first and second semiconductive composition before introducing to the crosslinking step c) or introduced during the crosslinking step. Peroxide is the preferred crosslinking agent for said optional first and second semiconductive compositions and is preferably included to the pellets of semiconductive composition before the composition is used in the cable production process as described above.

Crosslinking can be carried out at increased temperature which is chosen, as well known, depending on the type of crosslinking agent. For instance temperatures above 150° C., such as from 160 to 350° C., are typical, however without limiting thereto.

The processing temperatures and devices are well known in the art, e.g. conventional mixers and extruders, such as single or twin screw extruders, are suitable for the process of the invention.

The invention further provides a crosslinked power cable, preferably a crosslinked DC power cable, preferably a crosslinked HV or EHV DC power cable, comprising a conductor surrounded by one or more layers, preferably at least by an insulation layer, more preferably at least by an inner semiconductive layer, insulation layer and an outer semiconductive layer, in that order, wherein at least the insulation layer comprises the crosslinked polymer composition or any of the preferable subgroups or embodiments thereof as defined above or in claims. Optionally and preferably also one or both, preferably both, of the inner semiconductive composition and the optional and preferred outer semiconductive composition are crosslinked.

Naturally, the polymer composition of the invention used in at least one cable layer, preferably in an insulation layer, of the cable of the invention has, when crosslinked, the advantageous electrical properties and preferably any or all the mechanical properties as defined above or in claims.

The invention further provides the use of the Polymer composition, or any of the preferable subgroups or embodiments thereof, as defined above or in claims, in at least one layer, preferably in at least an insulation layer, of a crosslinked power cable, preferably of a crosslinked (DC) power cable, preferably of a crosslinked HV or EHV DC power cable, comprising a conductor surrounded by at least one layer, preferably at least an inner semiconductive layer, insulation layer and an outer semiconductive layer, in that order. The invention provides also the use of the Polymer composition, or any of the preferable subgroups or embodiments thereof, as defined above or in claims, for producing at least one layer, preferably at least an insulation layer, of a crosslinked power cable, preferably of a crosslinked (DC) power cable, preferably of a crosslinked HV or EHV DC power cable, comprising a conductor surrounded by at least one layer, preferably at least an inner semiconductive layer, insulation layer and an outer semiconductive layer, in that order.

The thickness of the insulation layer of the power cable, preferably of the DC cable, more preferably of the HV or EHV DC power cable, is typically 2 mm or more, preferably at least 3 mm, preferably of at least 5 to 100 mm, more preferably from 5 to 50 mm, when measured from a cross section of the insulation layer of the cable.

Determination Methods

Unless otherwise stated in the description or experimental part the following methods were used for the property determinations.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$).

Density

The density was measured according to ISO 1183-2. The sample preparation was executed according to ISO 1872-2 Table 3 Q (compression moulding).

Comonomer Contents a) Quantification of Alpha-Olefin Content in Linear Low Density Polyethylenes and Low Density Polyethylenes by NMR Spectroscopy:

The comonomer content was determined by quantitative 13 C nuclear magnetic resonance (NMR) spectroscopy after basic assignment (J. Randall JMS—Rev. Macromol. Chem. Phys., C29(2&3), 201-317 (1989)). Experimental parameters were adjusted to ensure measurement of quantitative spectra for this specific task.

Specifically solution-state NMR spectroscopy was employed using a Broker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140° C. Proton decoupled 13 C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125° C., a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

b) Comonomer Content of Polar Comonomers in Low Density Polyethylene (1) Polymers Containing >6 wt. % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 $cm^{-1}$ was divided with the peak height of polyethylene at 2020 $cm^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 $cm^{-1}$ was subtracted with the absorbance value for the base line at 2475 $cm^{-1}$ ($A_{methylacrylate}-A_{2475}$). Then the maximum absorbance peak for the polyethylene peak at 2660 $cm^{-1}$ was subtracted with the absorbance value for the base line at 2475 $cm^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer} - A_{1850}$). Then the maximum absorbance peak for polyethylene peak at 2660 cm$^{-1}$ was subtracted with the absorbance value for the base line at 1850 cm$^{-1}$ ($A_{2660} - A_{1850}$). The ratio between ($A_{comonomer} - A_{1850}$) and ($A_{2660} - A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

PENT (Pennsylvania Notch Test

The resistance to slow crack growth was assessed using the Pennsylvania Notch Test (PENT) according to ISO 16241:2005 with some modifications.

A compression moulded plaque of each material was produced according to the following procedure. Granules were heated in a closed mould at 180° C. for 15 minutes without pressure. The heat was turned off and a nominal pressure of 1.7 MPa was applied for 12.5 hours while the sample and mould were left to cool down naturally.

Dimensions of test piece: 60 mm×25 mm×10 mm
Principal notch: 3.5 mm deep
Side notches: 0.7 mm deep
Test temperature of test pieces: 70° C.
Test stress (calculated on the un-notched cross-sectional area): 2.0 MPa
2 test pieces per material
The time to failure was recorded, and the average from 2 test pieces calculated.

Tensile testing was done according to ISO 527-2:1993 using sample geometry 5 A and 250 mm/min of draw speed using an Alwetron TCT10, Lorentzen&WettreAB tensile tester.

The measured entities are: stress at break and strain at break.

FIG. 1 illustrates the sample geometry used in the tensile testing.

FIG. 1.
Sample Geometry:
L: 50±2 (mm)
$L_0$: 20±0.5 (mm)
$l_1$: 25±1 (mm)
$l_2$: =75 (mm)
$b_1$: 4±0.1 (mm)
$b_2$: 12.5±1 (mm)

The samples to use for tensile testing were moulded according to this schedule: 60 s at 120° C. and 20 bar after which the pressure was increased instantly to 200 bar and maintained for the rest of the moulding. The temperature was then increased to 180° C. over 180 s and maintained there for 360 s after which the sample was cooled to 35° C. over 600 s (15° C./min). The test sample was then punched out from the moulded plaque. This is based on the ISO 1872-2 and ISO 293 however with no preconditioning and cooling method B.

Crystallinity and melting temperature was measured with DSC using a TA Instruments Q2000. The temperature program used was starting at 30° C., heating to 180° C., an isotherm at 180° C. for 2 min and then cooling to −15° C., an isotherm at −15° C. for 2 min and then heating to 180° C. The heating and cooling rates are 10° C./min.

Samples which are cross linked were all cross-linked at 180° C. for 10 min and then degassed in vacuum at 70° C. over night to remove all peroxide by-products before the crystallinity and melt temperature was measured.

Melting temperature, $T_m$, is the temperature where the heat flow to the sample is at its maximum.

The degree of crystallinity, Crystallinity %, =100×ΔHf/ΔH 100% where ΔH100% (J/g) is 290.0 for PE (L. Mandelkem, Macromolecular Physics, Vol. 1-3, Academic Press, New York 1973, 1976 & 1980) The evaluation of crystallinity was done from 20° C.

DC Conductivity Method

The plaques are compression moulded from pellets of the test polymer composition. The final plaques consist of the test polymer composition and have a thickness of 1 mm and a diameter of 330 mm.

The plaques are press-moulded at 130° C. for 12 min while the pressure is gradually increased from 2 to 20 MPa. Thereafter the temperature is increased and reaches 180° C. after 5 min. The temperature is then kept constant at 180° C. for 15 min during which the plaque becomes fully cross-linked by means of the peroxide present in the test polymer composition. Finally the temperature is decreased using the cooling rate 15° C./min until room temperature is reached when the pressure is released. The plaques are immediately after the pressure release wrapped in metallic foil in order to prevent loss of volatile substances.

A high voltage source is connected to the upper electrode, to apply voltage over the test sample. The resulting current through the sample is measured with an electrometer. The measurement cell is a three electrodes system with brass electrodes. The brass electrodes are equipped with heating pipes connected to a heating circulator, to facilitate measurements at elevated temperature and provide uniform temperature of the test sample. The diameter of the measurement electrode is 100 mm. Silicone rubber skirts are placed between the brass electrode edges and the test sample, to avoid flashovers from the round edges of the electrodes.

The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the insulation.

This method and a schematic picture of the measurement setup for the conductivity measurements has been thoroughly described in a publication presented at the Nordic Insulation Symposium 2009 (Nord-IS 09), Gothenburg, Sweden, Jun. 15-17, 2009, page 55-58: Olsson et al, "Experimental determination of DC conductivity for XLPE insulation".

Method for Determination of the Amount of Double Bonds in the Polymer Composition or in the Polymer
A) Quantification of the Amount of Carbon-Carbon Double Bonds by IR Spectroscopy Quantitative infrared (IR) spectroscopy was used to quantify the amount of carbon-carbon doubles (C=C). Calibration was achieved by prior determination of the molar extinction coefficient of the C=C functional groups in representative low molecular weight model compounds of known structure.

The amount of each of these groups (N) was determined as number of carbon-carbon double bonds per thousand total carbon atoms (C=C/1000 C) via:

$$N = (A \times 14)/(E \times L \times D)$$

were A is the maximum absorbance defined as peak height, E the molar extinction coefficient of the group in question ($l \cdot mol^{-1} \cdot mm^{-1}$), L the film thickness (mm) and D the density of the material ($g \cdot cm^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 $cm^{-1}$ and analysed in absorption mode.

1) Polymer Compositions Comprising Polyethylene Homopolymers and Copolymers, Except Polyethylene Copolymers with >0.4 wt % Polar Comonomer For polyethylenes three types of C=C containing functional groups were quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $l \cdot mol^{-1} \cdot mm^{-1}$
    vinylidene (RR'C=CH2) via 888 $cm^{-1}$ based on 2-methyl-1-heptene [2-methyhept-1-ene] giving E=18.24 $l \cdot mol^{-1} \cdot mm^{-1}$
    trans-vinylene (R—CH=CH—R') via 965 $cm^{-1}$ based on trans-4-decene [(E)-dec-4-ene] giving E=15.14 $l \cdot mol^{-1} \cdot mm^{-1}$ For polyethylene homopolymers or copolymers with <0.4 wt % of polar comonomer linear baseline correction was applied between approximately 980 and 840 $cm^{-1}$.

2 Polymer Compositions Comprising Polyethylene Copolymers with >0.4 wt % Polar Comonomer For polyethylene copolymers with >0.4 wt % of polar comonomer two types of C=C containing functional groups were quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $l \cdot mol^{-1} \cdot mm^{-1}$
    vinylidene (RR'C=CH2) via 888 $cm^{-1}$ based on 2-methyl-1-heptene [2-methyhept-1-ene] giving E=18.24 $l \cdot mol^{-1} \cdot mm^{-1}$

EBA:

For poly(ethylene-co-butylacrylate) (EBA) systems linear baseline correction was applied between approximately 920 and 870 $cm^{-1}$.

EMA:

For poly(ethylene-co-methylacrylate) (EMA) systems linear baseline correction was applied between approximately 930 and 870 $cm^{-1}$.

3) Polymer Compositions Comprising Unsaturated Low Molecular Weight Molecules

For systems containing low molecular weight C=C containing species direct calibration using the molar extinction coefficient of the C=C absorption in the low molecular weight species itself was undertaken.

B) Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 $cm^{-1}$.

The molar extinction coefficient (E) was determined as $l \cdot mol^{-1} \cdot mm^{-1}$ via:

$$E = A/(C \times L)$$

were A is the maximum absorbance defined as peak height, C the concentration ($mol \cdot l^{-1}$) and L the cell thickness (mm).

At least three 0.18 $mol \cdot l^{-1}$ solutions in carbondisulphide ($CS_2$) were used and the mean value of the molar extinction coefficient determined.

Gel Content

Gel content is measured according to ASTM D 2765-01, Method A, using decaline extraction. The samples for method A were prepared by moulding from the test polymer composition comprising peroxide in the given amount. The moulding procedure was the following: The test sample composition was pressed 60 s at 120° C. and 20 bar after which the pressure was increased instantly to 200 bar and maintained for the rest of the moulding. The temperature was then increased to 180° C. over 180 s and maintained there for 360 s after which the sample was cooled to 35° C. over 600 s (15° C./min). The crosslinking occurred during the moulding step.

The obtained crosslinked plaques were then cut into 20 mm×20 mm×2 mm pieces and microtomed into 200 μm×2 mm stripes. The 0.3±0.015 g of the stripes were then used in the procedure as described in ASTM D 2765-01, Method A, with the following two deviations from this standard:

1) An addition extraction for 1 hour with new decaline was done in order to secure that all solubles were extracted.
2) Only 0.05% antioxidant (Irganox 1076) was added to the decalin instead of 1% as specified in the standard.

The gel content was then calculated according to said ASTM D 2765-01.

EXPERIMENTAL PART

Preparation of Polymers of the Examples of the Present Invention and the Comparative Example All polymers were low density polyethylenes produced in a high pressure reactor. As to CTA feeds, e.g. the PA content can be given as liter/hour or kg/h and converted to either units using a density of PA of 0.807 kg/liter for the recalculation.

LDPE1:

Ethylene with recycled CTA was compressed in a 5-stage precompressor and a 2-stage hyper compressor with intermediate cooling to reach initial reaction pressure of ca 2628 bar. The total compressor throughput was ca 30 tons/hour. In the compressor area approximately 4.9 litres/hour of propion aldehyde (PA, CAS number: 123-38-6) was added together with approximately 81 kg propylene/hour as chain transfer agents to maintain an MFR of 1.89 g/10 min. Here also 1,7-octadiene was added to the reactor in amount of 27 kg/h. The compressed mixture was heated to 157° C. in a preheating section of a front feed two-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 275° C. after which it was cooled to approximately 200° C. The subsequent 2nd peak reaction temperatures was 264° C. The reaction mixture was depressurised by a kick valve, cooled and polymer was separated from unreacted gas.
LDPE2:

Ethylene with recycled CTA was compressed in a 5-stage precompressor and a 2-stage hyper compressor with intermediate cooling to reach initial reaction pressure of ca 2904 bar. The total compressor throughput was ca 30 tons/hour. In the compressor area approximately 105 kg propylene/hour was added as chain transfer agents to maintain an MFR of 1.89 g/10 min. Here also 1,7-octadiene was added to the reactor in amount of 62 kg/h. The compressed mixture was heated to 159° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 289° C. after which it was cooled to approximately 210° C. The subsequent $2^{nd}$ and $3^{rd}$ peak reaction temperatures were 283° C. and 262° C. respectively with a cooling in between to 225° C. The reaction mixture was depressurised by a kick valve, cooled and polymer was separated from unreacted gas.

The components of the polymer compositions of inventive examples 1 to 4, reference example 1 (not crosslinked polyolefin) and reference example 2 (represents the prior art polymer composition crosslinked with a conventional amount of peroxide) and the properties and experimental results of the compositions are given in table 1. The used additives are commercially available:

Peroxide: DCP=dicumyl peroxide ((CAS no. 80-43-3)
Antioxidants: 4,4'-thiobis(2-tertbutyl-5-methylphenol) (CAS number: 96-69-5).
Additive: 2,4-Diphenyl-4-methyl-1-pentene (CAS-no. 6362-80-7).

The amount of DCP is given in mmol of the content of —O—O— functional group per kg polymer composition. The amounts are also given in brackets as weight-% (wt %).

TABLE 1

The properties of the compositions of the inventive and reference examples:

|  | Ref. 1 | Inv. 1 | Inv. 2 | Inv. 3 | Ref. 2 | Inv. 4 |
|---|---|---|---|---|---|---|
| POLYMER COMPOSITION: |  |  |  |  |  |  |
| Polyolefin | LDPE1 | LDPE1 | LDPE1 | LDPE1 | LDPE1 | LDPE2 |
| DCP, mmol of —O—O—/kg polymer composition (wt %) | 0 mmol | 10 mmol (=0.3 wt %) | 26 mmol (=0.7 wt %) | 28 mmol (=0.75 wt %) | 42 mmol (=1.15 wt %) | 19 mmol (=0.5 wt %) |
| 4,4'-thiobis (2-tertbutyl-5-methylphenol) (antioxidant) (wt %) | 0.08 | 0.08 | 0.08 | 0.08 | 0.08 | 0.08 |
| 2,4-Diphenyl-4-methyl-1-pentene (wt %) | 0 | 0.08 | 0.18 | 0.05 | 0.29 | 0.13 |
| PROPERTIES: |  |  |  |  |  |  |
| Crystallinity [%] | 45.4 | 44.8 | 42.4 | 41.7 | 40.6 | 40.2 |
| Melting point, $T_m$ [° C.] | 110 | 109 | 108 | 107 | 105 | 106 |
| EXPERIMENTAL RESULTS: |  |  |  |  |  |  |
| PENT [h], * means that the test stopped at that time point | 3.6 | 613 | 1635* |  | 795 |  |
| Conductivity at 30 kV/mm and 70° C. (Not degassed) [fS/m] |  | 20 | 30 | 26 | 48 | 24 |
| Gel content [%] |  |  | 57.4 |  |  |  |
| Tensile Properties −10° C.: |  |  |  |  |  |  |
| Stress at Yield [MPa] | 22 | 21 | 20 | 19 | 19 | 19 |
| Strain at Yield [%] | 6 | 7 | 7 | 8 | 8 | 8 |
| Stress at Break [MPa] | 20 |  | 35 | 37 | 36 | 33 |
| Strain at break [%] | 347 | 419 | 425 | 408 | 387 | 414 |
| Tensile Properties 70° C.: |  |  |  |  |  |  |
| Stress at Yield [MPa] | 5 | 5 | 8 |  | 9 | 9 |
| Strain at Yield [%] | 76 | 49 | 239 |  | 290 | 409 |
| Stress at Break [MPa] | 6 | 10 | 13 | 13 | 13 | 13 |
| Strain at Break [%] | 282 | 523 | 557 | 476 | 448 | 565 | wt %—values given in the table base on the total amount of the polymer composition.

TABLE 2

Properties of the polyolefin components

| Base Resin Properties | LDPE1 | LDPE2 |
|---|---|---|
| MFR 2.16 kg, at190° C. [g/10 min] | 1.89 | 1.89 |
| Density [kg/m³] | 923 | 921 |
| Vinyl [C=C/1000 C.] | 0.54 | 0.82 |
| Vinylidene [C=C/1000 C.] | 0.16 | 0.2 |
| Trans-vinylene [C=C/1000 C.] | 0.06 | 0.09 |
| Crystallinity [%] | 48.8 | 43.9 |
| Melting point, $T_m$ [° C.] | 110.2 | 109.3 |

Table 1 shows that the electrical conductivity of the inventive polymer compositions is markedly reduced compared to reference polymer composition 2, while mechanical properties expressed as tensile properties and PENT remain in the level comparable to or even improved over the levels of the ref 2. Also the gel content results shows that the inventive polymer compositions have degree of crosslinking which is feasible for the power cable including DC power cable applications.

What is claimed is:

1. A crosslinked DC power cable which comprises a conductor which is surrounded by at least an inner semi conductive layer comprising a first semiconductive composition, an insulation layer consisting of a polymer composition that has been crosslinked, and an outer semiconductive layer comprising a second semiconductive composition, in that order,
wherein the polymer composition of said insulation layer consists of, prior to crosslinking, a polyolefin, an antioxidant, a peroxide and a scorch retarder, wherein said peroxide is present in an amount of 10.0 to 28 mmol —O—O—/kg polymer composition, and
wherein the polyolefin is, prior to crosslinking, an unsaturated LDPE copolymer of ethylene with 1,7-octadiene, and
wherein the unsaturated LDPE copolymer contains vinyl groups and the total amount of vinyl groups present in the unsaturated LDPE is higher than 0.54/1000 carbon atoms and 0.82/1000 carbon atoms or less,
wherein the polymer composition has an electrical conductivity of 45 fS/m or less, and
wherein the peroxide is dicumylperoxide,
wherein the antioxidant is 4,4'-thiobis(2-tertbutyl-5-methylphenol),
wherein the scorch retarder is 2,4-diphenyl-4-methyl-1-pentene,
wherein the amount of antioxidant is 0.08 wt %,
wherein the amount of the scorch retarder is from 0.05 wt % to 0.18 wt % relative to the total amount of the polymer composition.

2. The crosslinked DC power cable according to claim 1, wherein the polymer composition has an electrical conductivity of 40 fS/m or less.

3. The crosslinked DC power cable according to claim 1, wherein the polymer composition has an electrical conductivity of 0.5 to 35 fS/m.

4. The crosslinked DC power cable according to claim 1, wherein the polymer composition has a PENT (Pennsylvania Notch Test) life time of 800 hours or more, when measured according to PENT test under load at 2 MPa and at ageing temperature of 70° C.

5. The crosslinked DC power cable according to claim 1, wherein the polymer composition has a Stress at Break at 70° C. of 12.0 MPa or more, or at −10° C. of 30.0 MPa or more.

6. The crosslinked DC power cable according to claim 1, wherein the polymer composition has a Strain at break (%) at 70° C. of 450% or more, or at −10° C. of 400% or more.

7. The crosslinked DC power cable according to claim 1 wherein the polyolefin comprises a total amount of carbon-carbon double bonds/1000 carbon atoms of more than 0.4/1000 carbon atoms.

8. The crosslinked DC power cable as claimed in claim 1, wherein the scorch retarder is present in the polymer composition of said insulation layer prior to crosslinking.

* * * * *